(12) United States Patent
Mobley et al.

(10) Patent No.: US 10,680,837 B2
(45) Date of Patent: Jun. 9, 2020

(54) ADAPTIVE POWER CONTROL FOR CABLE FIBER ACCESS NODE

(71) Applicant: CISCO TECHNOLOGY, INC., San Jose, CA (US)

(72) Inventors: Michael G. Mobley, Dacula, GA (US); Curtis Dalton, Cumming, GA (US); Dhanasekaran Nagarajan, Atlanta, GA (US); Doug Livezey, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/113,911

(22) Filed: Aug. 27, 2018

(65) Prior Publication Data

US 2020/0067721 A1 Feb. 27, 2020

(51) Int. Cl.
| | |
|---|---|
| *H04L 12/28* | (2006.01) |
| *H04B 10/564* | (2013.01) |
| *H04L 12/12* | (2006.01) |
| *H04L 12/24* | (2006.01) |

(52) U.S. Cl.
CPC .......... *H04L 12/12* (2013.01); *H04L 12/2801* (2013.01); *H04L 41/12* (2013.01); *H04L 41/32* (2013.01)

(58) Field of Classification Search
CPC .......... H04B 10/2575; H04B 10/25751; H04B 10/564; H04B 10/6931; H04B 17/0082; H04J 14/08; H04L 12/2885; H04N 21/61

USPC ........................................................ 370/250
See application file for complete search history.

(56) References Cited

U.S. PATENT DOCUMENTS

| 8,339,118 | B2* | 12/2012 | Kapusta, Jr. .......... H03F 1/0261 323/318 |
|---|---|---|---|
| 8,910,230 | B2* | 12/2014 | Rakib ................ H04N 21/6118 725/129 |
| 2004/0208652 | A1* | 10/2004 | Nagatomo ........... H03G 3/3084 398/210 |
| 2005/0077963 | A1* | 4/2005 | Behzad ................ H03F 1/0261 330/285 |
| 2006/0291786 | A1* | 12/2006 | Kiely .................. H01S 5/02248 385/92 |
| 2014/0282783 | A1* | 9/2014 | Totten ................ H04L 12/2885 725/111 |
| 2014/0328583 | A1* | 11/2014 | Al Sayeed .......... H04J 14/0289 398/7 |
| 2015/0295648 | A1* | 10/2015 | Mutalik ........... H04B 10/25751 725/131 |
| 2018/0109319 | A1* | 4/2018 | Jones ................... H04B 10/564 |

* cited by examiner

*Primary Examiner* — Edan Orgad
*Assistant Examiner* — Vanneilian Lalchinthang
(74) *Attorney, Agent, or Firm* — Merchant & Gould P.C.

(57) ABSTRACT

Adaptive power control may be provided. First, a network configuration change event may be detected by a computing device disposed in a node. Next, the computing device may determine, in response to detecting the network configuration change event, a bias current value for a forward launch amplifier disposed in the node based on the network configuration change event. The computing device may then cause, in response to determining the bias current value, the forward launch amplifier to be driven with the bias current value.

20 Claims, 3 Drawing Sheets

ADAPTIVE POWER CONTROL FOR CABLE FIBER ACCESS NODE

TECHNICAL FIELD

The present disclosure relates generally to node power control.

BACKGROUND

A Hybrid Fiber-Coaxial (HFC) network is a broadband network that combines optical fiber and coaxial cable. It has been commonly employed globally by cable television operators. In a Hybrid Fiber-Coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services. Systems incorporate additional elements to transmit signals upstream from the subscriber to the distribution facility.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
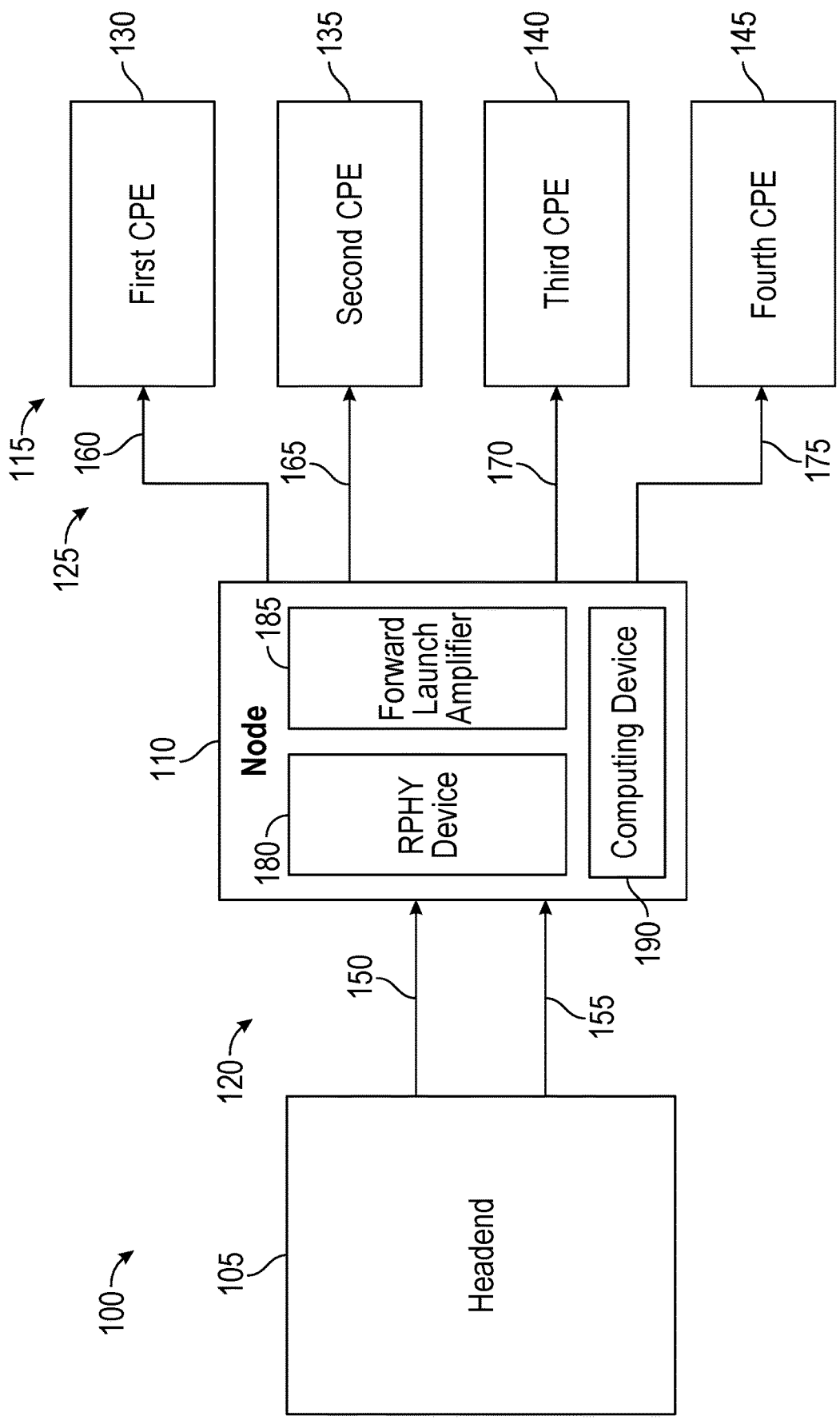
FIG. 1 is a block diagram of a communication system.

Adaptive power control may be provided. First, a network configuration change event may be detected by a computing device disposed in a node. Next, the computing device may determine, in response to detecting the network configuration change event, a bias current value for a forward launch amplifier disposed in the node based on the network configuration change event. The computing device may then cause, in response to determining the bias current value, the forward launch amplifier to be driven with the bias current value.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-System Operators (MSOs) may comprise operators of multiple cable or direct-broadcast satellite television systems. Fiber Deep (FD) is a trend in which MSOs push fiber ever closer to customers to provide them with better service. As opposed to an amplifier, a Hybrid Fiber-Coaxial (HFC) node may receive signals from a headend via fiber optic cable rather than via coaxial cable for example. In order to provide FD, many HFC nodes may be deployed onto an FD network.

The nodes in the HFC network may include a forward launch amplifier that may amplify the analog downstream signals to the customer premises equipment. With conventional nodes, a launch amplifier bias current may be set at a static value that may cause the forward launch amplifier to work across a predefined frequency spectrum that the node may be initially expected to operate within or with a particular Quadrature Amplitude Modulation (QAM) mode. However, in certain situations, the node may operate below or above the predefined frequency spectrum or in a different QAM mode. Accordingly, the aforementioned static value may cause the node to waste power or provide a degraded signal when the node is called upon to operate in a manner inconsistent with the aforementioned static launch amplifier bias current value.

Embodiments of the disclosure may use network configuration change events to trigger controlled adjustments (e.g., software controlled adjustments) to the launch amplifier bias current without operator intervention. This may allow an MSO to reduce power consumption of the node, for example, when less bandwidth may be utilized. These power savings may be multiplied across nodes in the HFC, thus providing significant cost reduction over the life of the nodes. Furthermore, this may allow the nodes to increase bias current immediately when an MSO performs a network change that may increase bandwidth requirements. This responsiveness may avoid signal degradation and impacts to quality of service provided by the nodes. Accordingly, embodiments of the disclosure may provide a node with an adaptive control that may respond to network configuration changes in order to adjust amplifier bias current without causing service disruption, data loss, or introduction of video impairments.

FIG. 1 is a block diagram of a communication system 100. As shown in FIG. 1, communication system 100 may comprise a headend 105, a node 110, a plurality of customer premises equipment 115, a plurality of headend communication lines 120, and a plurality of node communication lines 125. Headend 105 may comprise, but is not limited to, a cable television headend that may comprise a master facility for receiving television signals for processing and distribution over a cable television system (e.g., an HFC). Node 110 may receive downstream signals from headend 105 via fiber optic cable (e.g., headend communication lines 120) rather than via coaxial cable, for example.

Plurality of customer premises equipment 115 may comprise, for example, any terminal and associated equipment located at a subscriber's premises and connected with a carrier's telecommunication channel at a demarcation point. Plurality of customer premises equipment 115 may comprise a first customer premises equipment 130, a second customer premises equipment 135, a third customer premises equipment 140, and a fourth customer premises equipment 145. One of plurality of customer premises equipment 115, may comprise, but are not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Plurality of headend communication lines 120 may comprise a first headend communication line 150 and a second headend communication line 155. Headend communication lines 120 may comprise optical fibers. Plurality of node communication lines 125 may comprise a first node communication line 160, a second node communication line 165, a third node communication line 170, and a fourth node communication line 175. Plurality of node communication lines 125 may comprise coaxial cables of varying lengths. While FIG. 1 shows each one of plurality of node communication lines 125 as serving one customer premises equipment, each one of plurality of node communication lines 125 may serve many customer premises equipment locations and is not limited to one.

As shown in FIG. 1, node 110 may comprise a Remote Physical Layer (RPHY) device 180, a forward launch amplifier 185, and a computing device 190. A Cable Modem Termination System (CMTS) may be located in a headend. The CMTS may be used to provide high speed data services, such as cable Internet or Voice-Over-Internet Protocol, to subscribers. Remote Physical Layer (i.e., RPHY) may comprise shifting or distributing the physical layer (i.e., PHY) of a conventional cable headend CMTS to fiber nodes (e.g., node 110). RPHY device 180 may comprise circuitry to implement the physical layer of a CMTS.

Digital signals received by RPHY device 180 may be converted to analog signals and sent to forward launch amplifier 185. The analog signals received at forward launch amplifier 185 may be amplified by forward launch amplifier 185 and then sent to plurality of customer premises equipment 115 over plurality of node communication lines 125. Forward launch amplifier 185 may be biased (e.g., driven) with a bias current equal to a bias current value. The bias current may cause forward launch amplifier 185 to operate at a desired level that may minimize power usage without causing service disruption, data loss, or introduction of video impairments, for example. The desired level may comprise, for example, operating across a frequency spectrum that node 110 should operate within or with a particular QAM mode node 110 should operate at. Based on data, received for example from RPHY device 180, computing device 190 may determine the bias current value that may cause forward launch amplifier 185 to operate at a desired level. Forward launch amplifier 185 may then be biased (e.g., driven) with the bias current equal to the bias current value determined by computing device 190.

Computing device 190 may be practiced in hardware and/or in software (including firmware, resident software, micro-code, etc.) or in any other circuits or systems. Computing device 190 may be practiced in electrical circuits comprising discrete electronic elements, packaged or integrated electronic chips containing logic gates, a circuit utilizing a microprocessor, or on a single chip containing electronic elements or microprocessors. Furthermore, computing device 190 may also be practiced using other technologies capable of performing logical operations such as, for example, AND, OR, and NOT, including but not limited to, mechanical, optical, fluidic, and quantum technologies. Furthermore, computing device 190 may be located in RPHY device 180.

Figure 2:
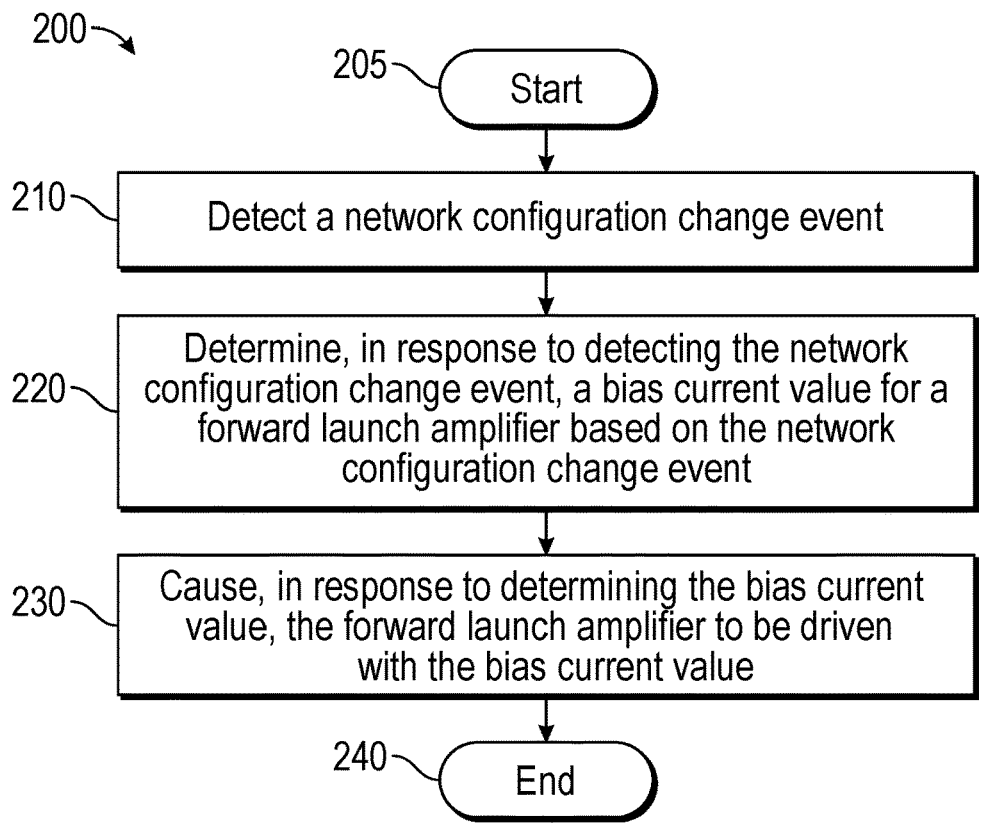
FIG. 2 is a flow chart of a method for providing adaptive power control.

FIG. 2 is a flow chart setting forth the general stages involved in a method 200 consistent with embodiments of the disclosure for providing adaptive power control. Method 200 may be implemented using a computing device 190 as described above with respect to FIG. 1 and in more detail below with respect to FIG. 4. Ways to implement the stages of method 200 will be described in greater detail below.

Method 200 may begin at starting block 205 and proceed to stage 210 where computing device 190 may detect a network configuration change event. For example, the network configuration change event may comprise an event that effects the power needs of forward launch amplifier 185. Events that effect power needs may comprise, but are not limited to: i) the addition of at least one QAM carrier to the frequency spectrum served by forward launch amplifier 185; ii) the removal of at least one QAM carrier from the frequency spectrum served by forward launch amplifier 185; and iii) a change to the QAM modulation mode of at least one QAM channel served by forward launch amplifier 185. The change to the QAM modulation mode may comprise switching from the QAM 256 mode to the QAM 1024 mode for example.

Because RPHY device 180 may be provisioned by headend 105 with data indicating the number of QAM carries and the QAM modulation mode corresponding to the analog signal that forward launch amplifier is to process, RPHY device 180 may provide this data to computing device 190. In other words, computing device 190 may detect the network configuration change event in response to RPHY device 180 periodically providing computing device 190 with data indicating the current number of QAM carries and the QAM modulation mode of the frequency spectrum served by forward launch amplifier 185.

From stage 210, where computing device 190 detects the network configuration change event, method 200 may advance to stage 220 where computing device 190 may determine, in response to detecting the network configuration change event, a bias current value for forward launch amplifier 185 based on the network configuration change event. For example, based on data corresponding to the network configuration change event received, for example, from RPHY device 180, computing device 190 may determine the bias current value that may cause forward launch amplifier 185 to operate at a desired level. Based on a lookup table query including, but not limited to, the current number of QAM carries, the QAM modulation mode, and the maximum frequency of the frequency spectrum to be served by a forward launch amplifier 185, the lookup table query may return the bias current value that may cause forward launch amplifier 185 to operate at the desired level.

In other words, computing device 190 may determine the appropriate reduction or increase in the bias current internally based on the nature of the network configuration change event and the power required. No new functionality may need to be implemented on the CMTS, DACS/DNCS, or CCAP Core, and these devices may not need to specifically communicate power changes to node 110. Instead, node 110 may trigger off network events that occur, and then determine the new bias current value based, for example, on the network configuration change event and the power required.

Figure 3:
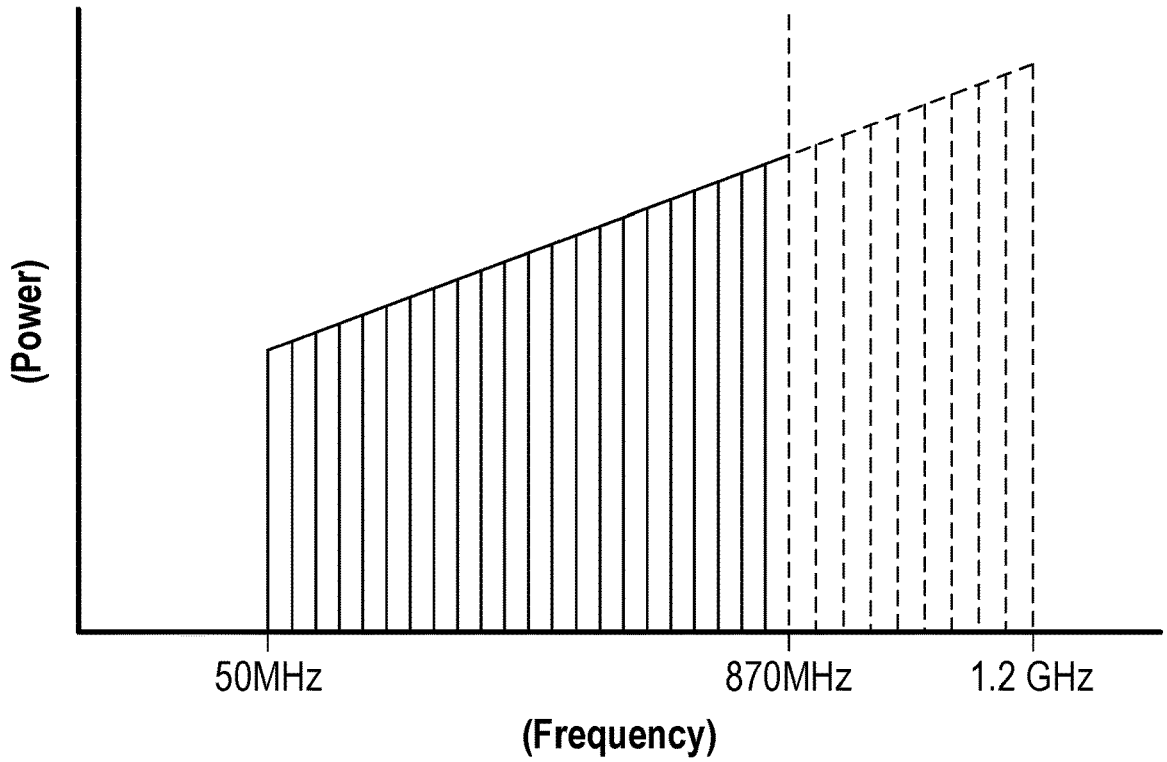
FIG. 3 illustrates a frequency spectrum served by a forward launch amplifier.

FIG. 3 illustrates an example of a frequency spectrum of a signal that may be sent by forward launch amplifier 185 to plurality of customer premises equipment 115 over plurality of node communication lines 125. For example, the analog signal received at forward launch amplifier 185 may be amplified and up tilted across all frequencies by forward launch amplifier 185. The up tilting of the signal may be provided in order to compensate for signal attenuation at higher frequencies in the plurality of node communication lines 125. As illustrated in FIG. 3, the frequency spectrum may be divided among QAM carriers. Because the maximum frequency for forward launch amplifier 185 may comprise 870 MHz to cover the instantiated QAM carries for example, the bias current may comprise a value that may minimize power usage at 870 MHz without causing service disruption, data loss, or introduction of video impairments for example. In other words, driving forward launch amplifier 185 above 870 MHz may waste power because no QAM carries may be instantiated above 870 MHz. Also, because the up tilting may cause higher power usage for the higher frequencies, cutting back for these higher frequencies saves more power than cutting back lower frequencies.

In a conventional system, the launch amplifier has a bias current input that is set to optimize performance over the entire spectrum of the HFC plant, for example, up to 1.2 GHz maximum bandwidth. However, most MSOs do not operate their HFCs at this maximum bandwidth. Instead, many deployments have a maximum carrier frequency of 870 MHz. Consequently, conventional systems consume more power by the node than necessary to meet the performance requirements. With embodiments of the disclosure, power usage may be reduced by lowering the bias current into forward launch amplifier 185 based on network configuration change events without causing service disruption, data loss, or introduction of video impairments. Furthermore, consistent with embodiments of the disclosure, if the maximum bandwidth is later increased or decreased (e.g., to cover the increase or decrease of QAM carries respectively), node 110 may still meet the performance requirements necessary to avoid service disruption, data loss, or signal impairments because the bias current may be dynamically adjusted based on network configuration change events.

Once computing device 190 determines, in response to detecting the network configuration change event, the bias current value for forward launch amplifier 185 based on the network configuration change event in stage 220, method 200 may continue to stage 230 where computing device 190 may cause, in response to determining the bias current value, forward launch amplifier 185 to be driven with the bias current value. For example, forward launch amplifier 185 may then be biased (e.g., driven) with the bias current equal to the bias current value determined by computing device 190.

Consequently, embodiments of the disclosure may use network configuration change events to trigger node 110 to make adjustments to the bias current of forward launch amplifier 185. This may allow node 110 to reduce amplifier power consumption by reducing bias current when a network configuration change indicates that less bandwidth may be needed. Moreover, it may allow node 110 to increase bias current immediately when an MSO may perform a network change that may increase bandwidth requirements of node 110. Accordingly, power consumption of node 110 may be reduced without causing service disruption, data loss, or video impairments, by adaptively responding to network change events. Once computing device 190 causes, in response to determining the bias current value, forward launch amplifier 185 to be driven with the bias current value in stage 230, method 200 may then end at stage 240.

Embodiments of the disclosure may provide, for example, advantages in many use-cases. Two example use-cases may be described below. First, as mentioned earlier, most HFCs are not fully populated with QAM carriers out to 1.2 GHz. This unused portion of the spectrum (e.g., from 870 MHz to 1.2 GHz) may represent a significant decrease in the Total Composite Power (TCP) of the amplified spectrum, and therefore a significant reduction in amplifier bias current may be made until these high-frequency channels are populated. However, the MSOs deploy nodes with the capability of meeting performance specifications when the entire spectrum is populated out to 1.2 GHz.

Consistent with embodiments of the disclosure, the bias current may be reduced to forward launch amplifier 185 when the spectrum is only partially populated. Then node 110 may immediately respond to a network configuration change event of the operator adding additional QAM carriers later. As a result, the MSOs can deploy a node now, reap a significant power savings in the near term, and know that the node may adjust without service impact when additional bias current is needed to meet the power needs of a growing spectrum.

According to a second use case, the Adaptive Power System Interface Specification (APSIS) group has specified a power saving scheme in which the QAM channel count may be reduced during low traffic periods, for example, late at night. Node 110, consistent with embodiments of the disclosure, may be able to immediately detect the network configuration change of the removal of certain QAM carriers and reduce the bias current to forward launch amplifier 185, which may reduce the total power consumed by node 110. When the QAM carriers are added back to the lineup later, node 110 may immediately detect this network change event and may increase the bias current accordingly, thereby avoiding any signal degradation and associated service interruption. The network change events that node 110 may detect may be normal operational changes in the HFC rather than specific power information coming from the CMTS, DACS/DNCS, or CCAP Core for example.

Figure 4:
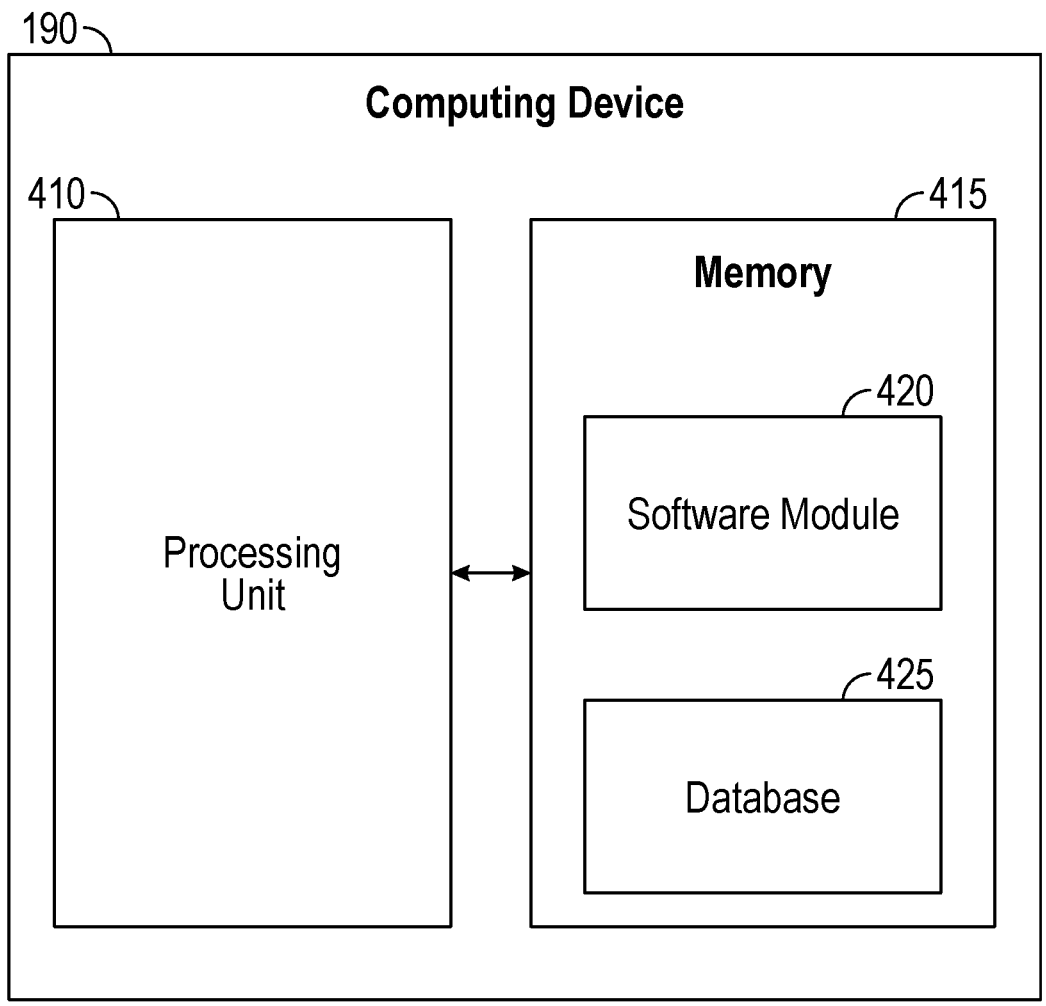
FIG. 4 is a block diagram of a computing device.

FIG. 4 shows computing device 190. As shown in FIG. 4, computing device 190 may include a processing unit 410 and a memory unit 415. Memory unit 415 may include a software module 420 and a database 425. While executing on processing unit 410, software module 420 may perform, for example, processes for providing adaptive power control, including for example, any one or more of the stages from method 200 described above with respect to FIG. 2.

Computing device 190 may be implemented using a personal computer, a network computer, a mainframe, a router, or other similar microcomputer-based device. Computing device 190 may comprise any computer operating environment, such as hand-held devices, multiprocessor systems, microprocessor-based or programmable sender electronic devices, minicomputers, mainframe computers, and the like. Computing device 190 may also be practiced in distributed computing environments where tasks are performed by remote processing devices. The aforementioned systems and devices are examples and computing device 190 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 190 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   detecting, by a computing device disposed in a node, a network configuration change event;
   determining, by the computing device in response to detecting the network configuration change event, a bias current value for a forward launch amplifier disposed in the node based on the network configuration change event, wherein determining the bias current value for the forward launch amplifier comprises:
      receiving, from a remote physical layer device, a network configuration change information comprising a current number of Quadrature Amplitude Modulation (QAM) carriers, a QAM modulation mode, and a maximum frequency of a frequency spectrum to be served by the forward launch amplifier,
      performing a lookup query for each of the current number of the QAM carriers, the QAM modulation mode, and the maximum frequency of the frequency spectrum, and
      determining based on the lookup query the bias current value for the forward launch amplifier, wherein determining the bias current value comprises determining at least one of the following: an increase in the bias current value and a decrease in the bias current value; and
   causing, by the computing device in response to determining the bias current value, the forward launch amplifier to be driven with the bias current value.

2. The method of claim 1, wherein determining the bias current value for the forward launch amplifier disposed in the node comprises determining the bias current value for the forward launch amplifier disposed in the node wherein the node is connected in a Hybrid Fiber-Coaxial (HFC) network.

3. The method of claim 1, wherein detecting the network configuration change event comprises detecting the network configuration change event that effects a power needs of the forward launch amplifier.

4. The method of claim 1, wherein the network configuration change event comprises addition of at least one QAM carrier to the frequency spectrum served by the forward launch amplifier.

5. The method of claim 1, wherein the network configuration change event comprises removal of at least one QAM carrier from the frequency spectrum served by the forward launch amplifier.

6. The method of claim 1, wherein the network configuration change event comprises a change to the QAM modulation mode of at least one QAM channel served by the forward launch amplifier.

7. The method of claim 1, wherein causing the forward launch amplifier to be driven with the bias current value comprises causing the forward launch amplifier to be driven with the bias current value wherein the bias current value does not degrade service.

8. A system comprising:
a memory storage; and
a processing unit coupled to the memory storage, wherein the processing unit is disposed in a node and operative to:
  detect a network configuration change event;
  determine, in response to detecting the network configuration change event, a bias current value for a forward launch amplifier disposed in the node based on the network configuration change event, wherein the processing unit being operative to determine the bias current value for the forward launch amplifier comprises the processing unit being operative to:
  receive from a remote physical layer device a network configuration change information comprising a current number of Quadrature Amplitude Modulation (QAM) carriers, a QAM modulation mode, and a maximum frequency of a frequency spectrum to be served by the forward launch amplifier,
  perform a lookup query for each of the current number of the QAM carriers, the QAM modulation mode, and the maximum frequency of the frequency spectrum, and
  determine based on the lookup query the bias current value for the forward launch amplifier, wherein the processing unit configured to determine the bias current value comprises the processing unit being configured to wherein determine at least one of the following: an increase in the bias current value and a decrease in the bias current value; and
cause, in response to determining the bias current value, the forward launch amplifier to be driven with the bias current value.

9. The system of claim 8, wherein the node is connected in a Hybrid Fiber-Coaxial (HFC) network.

10. The system of claim 8, wherein the network configuration change event effects power needs of the forward launch amplifier.

11. The system of claim 8, wherein the network configuration change event comprises addition of at least one QAM carrier to the frequency spectrum served by the forward launch amplifier.

12. The system of claim 8, wherein the network configuration change event comprises removal of at least one QAM carrier from the frequency spectrum served by the forward launch amplifier.

13. The system of claim 8, wherein the network configuration change event comprises a change to the QAM Amplitude modulation mode of at least one QAM channel served by the forward launch amplifier.

14. The system of claim 8, wherein the processing unit being operative to cause the forward launch amplifier to be driven with the bias current value comprises the processing unit being operative to cause the forward launch amplifier to be driven with the bias current value wherein the bias current value does not degrade service.

15. A non-transitory computer-readable medium that stores a set of instructions which when executed perform a method comprising:
detecting, by a computing device disposed in a node, a network configuration change event;
determining, by the computing device in response to detecting the network configuration change event, a bias current value for a forward launch amplifier disposed in the node based on the network configuration change event, wherein determining the bias current value for the forward launch amplifier comprises:
  receiving from a remote physical layer device a network configuration change information comprising a current number of Quadrature Amplitude Modulation (QAM) carriers, a QAM modulation mode, and a maximum frequency of a frequency spectrum to be served by the forward launch amplifier,
  performing a lookup query for each of the current number of the QAM carriers, the QAM modulation mode, and the maximum frequency of the frequency spectrum, and
  determining based on the lookup query the bias current value for the forward launch amplifier, wherein determining the bias current value comprises determining at least one of the following: an increase in the bias current value and a decrease in the bias current value; and
causing, by the computing device in response to determining the bias current value, the forward launch amplifier to be driven with the bias current value.

16. The non-transitory computer-readable medium of claim 15, wherein detecting the network configuration change event comprises detecting the network configuration change event that effects power needs of the forward launch amplifier.

17. The non-transitory computer-readable medium of claim 15, wherein the network configuration change event comprises addition of at least one QAM carrier to the frequency spectrum served by the forward launch amplifier.

18. The non-transitory computer-readable medium of claim 15, wherein the network configuration change event comprises removal of at least one QAM carrier from the frequency spectrum served by the forward launch amplifier.

19. The non-transitory computer-readable medium of claim 15, wherein the network configuration change event comprises a change to the QAM modulation mode of at least one QAM channel served by the forward launch amplifier.

20. The non-transitory computer-readable medium of claim 15, wherein causing the forward launch amplifier to be driven with the bias current value comprises causing the forward launch amplifier to be driven with the bias current value wherein the bias current value does not degrade service.

* * * * *